350-171 CROSS REFERENCE SEARCH ROOM

Sept. 24, 1968 H. SEIDEL 3,403,262

PLURAL CHANNEL OPTICAL MEMORY WITH INTENSITY MODULATION FOR DISCRIMINATING AMONG CHANNELS

Filed March 8, 1965 2 Sheets-Sheet 1

INVENTOR
H. SEIDEL
BY Herbert M. Shapiro
ATTORNEY

Sept. 24, 1968 H. SEIDEL 3,403,262

PLURAL CHANNEL OPTICAL MEMORY WITH INTENSITY MODULATION FOR DISCRIMINATING AMONG CHANNELS

Filed March 8, 1965 2 Sheets-Sheet 2

United States Patent Office 3,403,262
Patented Sept. 24, 1968

3,403,262
PLURAL CHANNEL OPTICAL MEMORY WITH INTENSITY MODULATION FOR DISCRIMINATING AMONG CHANNELS

Harold Seidel, Fanwood, N.J., assignor to Bell Telephone Laboratories, Incorporated, New York, N.Y., a corporation of New York Filed Mar. 8, 1965, Ser. No. 437,771
6 Claims. (Cl. 250—219)

This invention relates to signal translating systems and, more particularly, to deflection systems employing electromagnetic wave radiation, typically light.

Light deflection systems, employed, for example, for accessing memories, typically comprise a source of a beam of light and a digital multistage light deflector for routing that beam to a selected output position in response to a particular combination of inputs to the stages thereof. The bit location of the memory corresponding to that selected position, accordingly, is accessed by the beam, and the presence or absence of an obstruction in the accessed location is registered by the absence or presence, respectively, of the beam at a detector adjacent the memory.

This arrangement, of course, is bit organized. Word organization, however, is frequently desirable. The latter is achieved by directing light in the output position of the light deflector to the corresponding bit location on each of a plurality of memory media. Typically, these "media" are formed on one memory plane as shown in "Large-Capacity Memory Techniques for Computing Systems," edited by Yovits, p. 79 et seq. The "fanout" of light from a selected output position of a deflector to a plurality of bit locations is frequently termed "paralleling." The apparatus for achieving the fanout is conveniently termed a "multiple channel arrangement."

It has been found recently that a marked improvement in signal-to-noise ratio is achieved by reflecting light back through a memory plane, back through the light deflector, along what is essentially a mirror image of its forward transmission path therethrough, to a detector positioned near the source of the light beam. This arrangement, termed a "reflective-type light deflection system" and disclosed in copending application Ser. No. 420,976, filed Dec. 24, 1964, for J. T. Sibilia and W. J. Tabor, now abandoned, is incompatible with the multiple channel arrangement. The reason for this is that a reflective-type light deflection system typically includes mirrors next adjacent the memory plane. If a multiple channel arrangement is used to divide the light in a selected output position of a deflector, mirrors next adjacent the memory planes merely reconstitute the divided light, upon reflection thereby, into a single beam at that position for retraversing the forward transmission path of the light. The information in the several bit locations is lost when that beam is reconstituted. Reflective-type light deflection systems, consequently, are presently operable only on a bit-organized basis.

An object of this invention is to provide a reflective-type light deflection system operable on a word-organized basis.

The above and further objects of this invention are realized in one embodiment thereof wherein a reflective-type light deflection system provided with a multiple channel arrangement includes a modulator in each channel to modulate the intensity of light energy reflected by the reflector adjacent the corresponding memory medium at a frequency characteristic for each channel. Upon reflection, rather than merely reconstituting the forward beam, the returning beam includes light of different characteristic frequencies. Frequency responsive detection means are provided for detecting the several outputs individually.

Accordingly, a feature of this invention is a reflective-type light deflection system wherein an input beam is modulated in each channel at a frequency which is characteristic for that channel.

Another feature of this invention is a reflective-type light deflection system including means for detecting the characteristic frequencies of light in the various channels.

The foregoing and further objects and features of this invention will be understood more fully from a consideration of the following detailed description rendered in conjunction with the accompanying drawing, wherein.

Figure 1:
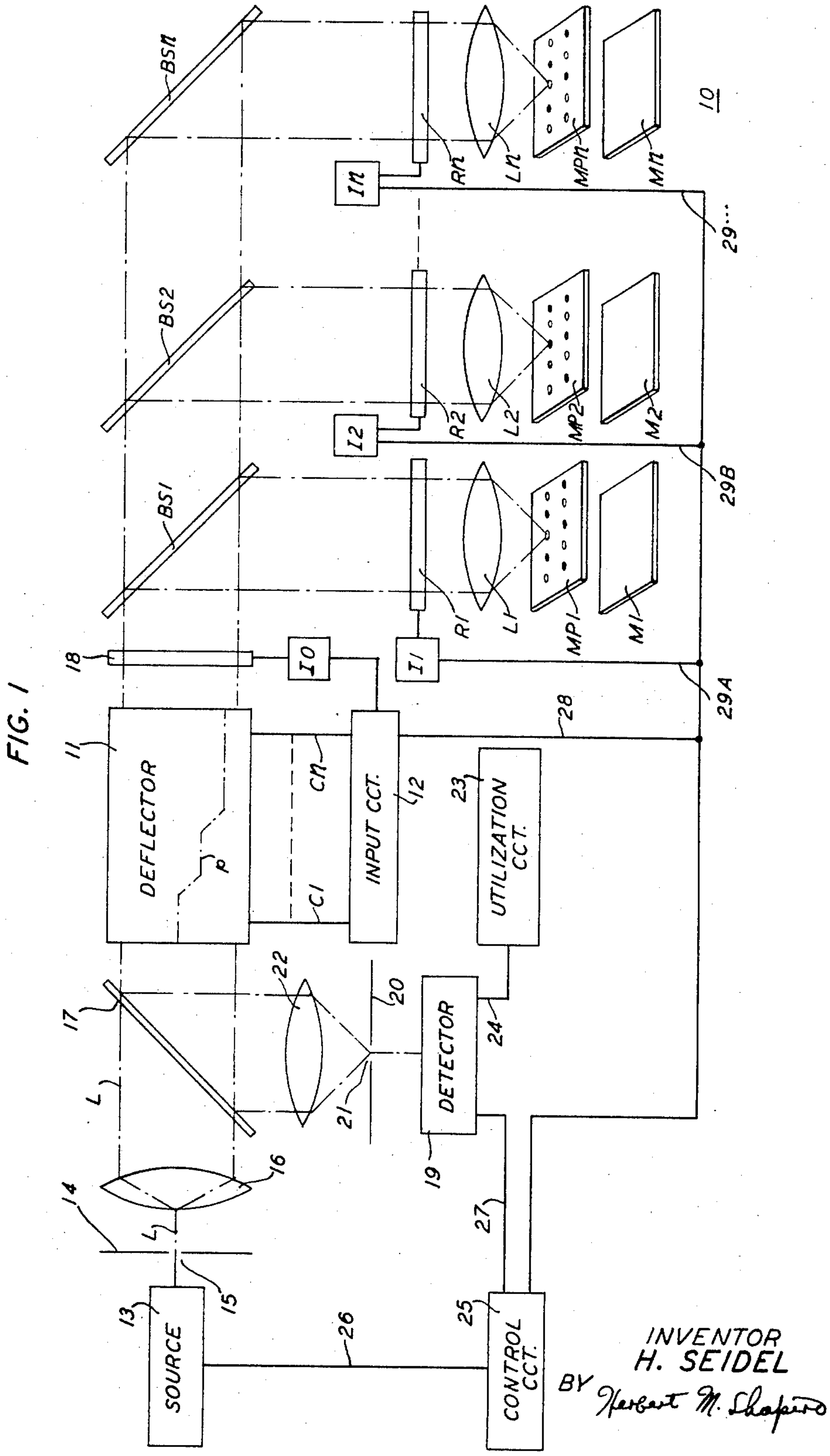
FIG. 1 is a schematic representation of an illustrative embodiment in accordance with this invention.

FIG. 1 shows a reflective-type light deflection system 10 operable on a word-organized basis in accordance with this invention. The system includes a light deflector 11 including an input circuit 12 to the various stages thereof. The input circuit and the stages of the deflector and the operation thereof are all well known in the art. Further, an understanding of the structure and operation of the stages and input circuitry is not necessary for an understanding of this invention. Therefore, a detailed discussion of the stages and input circuit and their operation are omitted. It is sufficient merely to indicate the input circuit and the conductors C1 . . . C*n* to the corresponding stages and to state that each stage includes a modulator, or polarization rotator, of a type well known and a deflector such as, for example, a birefringent crystal. Inputs are applied in terms of a voltage-no voltage code to the various stages, via the corresponding conductors, to rotate the plane of polarization of light for determining the direction of deflection by the polarizer at that stage. Importantly, a path P, through the deflector, is determined by those inputs, and light, consequently, emerges from the output end of the deflector (the right end as viewed in FIG. 1) in a corresponding output position (not shown) and having a particular polarization direction.

A source 13 of a beam of plane polarized light is positioned adjacent the input end of deflector 11 (the left end as viewed in FIG. 1). Source 13 is separated from deflector 11 by a plate 14, having an aperture 15 therein, a lens 16, and a beam splitter 17.

A succession of beam splitters BS1, BS2, . . . BS*n* is positioned adjacent the output end of deflector 11, spaced apart therefrom by a polarization modulator 18. Each beam splitter has associated therewith a lens, a memory plane MP, and a fully reflective mirror M. The designations for these elements include numerals corresponding to the numeral in the designation of the associated beam splitter.

Positioned between each lens and the associated beam splitter is a polarization modulator, designated R, with a corresponding numeral. Each of these modulators is connected to a correspondingly designated input circuit I1, I2 . . . I*n*.

A detector 19 is positioned adjacent beam splitter 17 near the input end of deflector 11. The detector 19 is separated from beam splitter 17 by a plate 20, having an aperture 21 therein, and by a lens 22. A utilization circuit 23 is connected to detector 19 by means of a conductor 24. Source 13 and detector 19 are connected to a control circuit 25 by means of conductors 26 and 27, respectively.

Input circuit 12 and input circuits I1, I2 . . . I*n* are connected to control circuit 25 by means of conductors 28 and 29A, 29B . . ., respectively. An additional input circuit $I_o$ is connected between modulator 18 and input circuit 12.

The operation of the system shown in FIG. 1 will now be described in terms of an assumed illustrative word 10 . . . 1 stored in corresponding bit locations of memory planes MP1, MP2 . . . MP*n*. To this end, a memory plane suitable in accordance with this invention is, for example, a photographic plate having an array of opaque spots developed therein. Information is stored as the presence and absence of spots in corresponding locations in each of the memory planes. The presence of a spot acts as an obstruction to light. Thus, light incident to that spot is not detected by the detector and is taken to correspond to a binary "zero." The absence of a spot, conversely, is taken to correspond to a binary "one."

In operation, source 13 provides a beam of polarized light under the control of control circuit 25. The general propagation direction of the beam is indicated by the broken line designated L in FIG. 1. The beam is directed through aperture 15 in plate 14 which acts to form an image. The beam next passes through lens 16 which enlarges the beam providing essentially parallel rays to deflector 11. Deflector 11 deflects the beam along path P to a prescribed output position in response to the combination of inputs to the various stages thereof as described more fully in the cited application of Sibilia et al. The beam passes through modulator 18 and then through the succession of beam splitters BS1, BS2 . . . BS*n*. For the moment, the description of the operation of modulator 18 is postponed.

The beam splitters BS1, BS2 . . . BS*n* divide the beam into beams of desirably equal intensity. To this end, the beam splitters have successively greater reflectivity. Thus, beams of substantially equal intensity pass through the modulators R1, R2 . . . R*n*.

The modulators R1, R2 . . . R*n* rotate at different frequencies the polarization direction of light incident thereto. This modulation is accomplished by providing an alternating voltage across a representative modulator, for example R1, by input circuit I1 under the control of control circuit 25. In this connection, the modulator may be, basically, a crystal of potassium dihydrogen phosphate (KDP) or potassium tantalate niobate (KTN) described in copending application Ser. No. 353,049, filed Mar. 19, 1964, for R. T. Denton, J. E. Geusic and L. G. Van Uitert now Patent 3,290,619 issued Dec. 6, 1966. Modulator R1 may, for example, be modulated by the alternating voltage at 100 megacycles, R2 at 110 megacycles, and R*n* at $100+10n$ megacycles. In this manner, the intensity of light incident to a corresponding location in each of the memory planes is varied at a frequency characteristic for each memory plane.

It is helpful to recognize, at this juncture, that the light incident to, for example, modulator R1 is plane polarized. In order to modulate the intensity of this light, modulator R1 includes a polarizing filter material such as a polaroid sheet or a nicol prism on one side of it in the path of the light. Since an understanding of the modulation is essential to the understanding of operation in accordance with this invention, the modulator and its operation will now be discussed more fully in terms of FIG. 3 before proceeding with the description of the operation.

Figure 3:
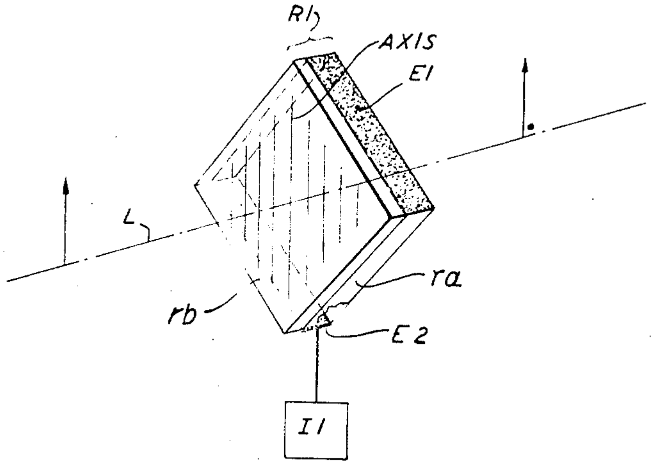
FIG. 3 is an enlarged schematic representation of a portion of the illustrative embodiment of FIG. 1.

FIG. 3 shows a representative modulator R1 used, in accordance with this invention, for modulating the intensity of light incident upon a memory medium. Light, represented by broken line L is shown in the figure incident to a first surface of modulator R1. The light is assumed polarized vertically as represented by the upward directed arrow shown to the left as viewed in the figure. In this connection, the arrow merely represents the axis along which the light energy vibrates rather than an actual direction. The modulator, as is already stated, is complex. The portion *ra* of the modulator comprises a modulating material which rotates the direction of polarization of incident light only if a voltage is impressed across it. The portion *ra* is adjoined by a portion *rb* of ordinary polarizing material. Light from the deflector is directed at portion *rb* the axis of which is oriented to pass light polarized in this direction. An electric field is applied to the portion *ra* via electrodes E1 and E2 oriented to provide a field at 45 degrees with respect to the axis of polarizer *rb*. The electrodes E1 and E2 are shown oriented at 45 degrees with respect to the vertical as viewed in the figure. The axis of portion *rb* is shown oriented vertically. In response to the alternating voltage applied thereto, portion *ra* rotates the direction of polarization in a well known manner providing thereby horizontal and vertical components having varying intensities. Accordingly, the intensity of light in the two polarization components passed by portion *ra* is a function of the voltage applied by the input circuit I1.

Modulator 18 functions to provide light polarized in a direction compatible with representative modulator R1. To this end, modulator 18 rotates or does not rotate the polarization direction of light in the selected output position of deflector 11. This operation is provided by modulator 18 in response to a voltage-no voltage input from circuit $I_o$. In turn, circuit $I_o$ is responsive to the combination of inputs to the deflector by input circuit 12. When those inputs select an output position in which the polarization direction of light is already suitable, no voltage is applied to modulator 18. When the selected output position includes light polarized in the orthogonal direction, a voltage is applied to modulator 18. In this connection, modulator 18 may be any modulator capable of operating in accordance with this invention as, for example, a KTN crystal, without polarizers as required by modulator R. The logic circuitry required for such operation also is well known and may be a part of circuit $I_o$.

Accordingly, light having its components modulated at characteristic frequencies is focused by lenses L1, L2 . . . L*n* onto corresponding bit locations in memory planes MP1, MP2 . . . MP*n*. For the assumed illustrative word, the accessed location in memory plane MP2 includes an opaque spot as shown in FIG. 1. Therefore, light at 110 megacycles is obstructed. Light incident to the corresponding location on memory planes MP1 and MP*n* is passed therethrough in accordance with the assumed absence of opaque spots there. The absence of opaque spots is indicated by the unblackened circles on memory planes MP1 and MP*n*.

The light passed by memory planes MP1 and MP*n* is reflected by mirrors M1 and M3 back through the corresponding memory planes and lenses to the corresponding modulators. Once again, it is helpful to remember that the reflected light has components of varying intensities and orthogonal polarization directions. The light passes portion *ra* to portion *rb* (see FIG. 3) which passes only that component polarized vertically and extinguishes the component in the orthogonal direction. Therefore, plane polarized light of varying intensity is directed at, for example, beam splitter BS1. In this connection, the distances between the output of the deflector 11 and mirrors M1, M2 . . . M*n* are maintained substantially equal such that returning light reflected by the latter has a proper phase relation with the modulated forward beam. Maximum modulation is achieved when the optic axis of the modulator is at a 45 degree orientation with respect to the polarization direction of the forward beam and the optical path through the modulator provides quarter-wave retardation in each of the forward and returning beams at the voltage applied.

The returning beam is partially reflected by beam splitter BS1, through modulator 18, back through deflector 11. The polarization direction of the returning beam is further rotated by modulator 18 to its original polarization direction if the modulator is set to rotate the polarization direction of the forward beam. In turn, the beam is deflected by beam splitter 17 through converging lens 22, through aperture 21 in plate 20 to detector 19.

Detector 19 thus receives plane polarized light modulated at different frequencies characterizing different memory planes. For the assumed illustrative word 10 . . . 1, one frequency characterizes memory plane MP1, the frequency characteristic of memory plane MP2 is absent, and another frequency characterizes memory plane MP*n*. The output of detector 19 is conducted to utilization circuit 23 via conductor 24. In this connection, detector 19 may be any detector suitable for operation in accordance with this invention such as, for example, a photodiode. Utilization circuit 23 may be, for example, any well known channel drop network including tank circuits responsive to different frequencies. Such networks are aavilable, for example, in the 100 kilocycle-200 megacycle range from Merrimac R & D Co., Irvington, N.J., and are well known in the art.

Figure 2:
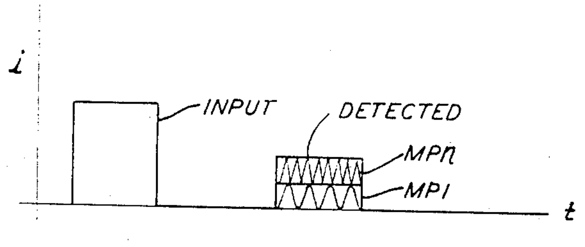
FIG. 2 is a graph showing an illustrative output pulse produced during the operation of the embodiment of FIG. 1 in accordance with this invention.

Thus, detector 19 detects light having a plurality of frequencies within an envelope defined essentially by the input pulse. FIG. 2 illustrates an input and a detected pulse in accordance with this arrangement. The pulses are illustrated on a light intensity *i* versus time *t* graph. A one microsecond input light pulse gives rise to, essentially, a one microsecond output pulse including a plurality of characteristic frequencies. The frequencies are shown only schematically and are designated to correspond to the memory plane they characterize. It is noted that the amplitude of the detected pulse is smaller than that of the input pulse. Since light is detected only when light is reflected by mirrors M1, M2 . . ., stored binary zeroes (obstructions) do not contribute. The detected light amplitude, accordingly, is 1/*n*th lower than that of the input for each zero interrogated.

In one specific embodiment of this invention successive modulators R1, R2, and R3 are modulated at 100 megacycles, 110 megacycles, and 120 megacycles, respectively. The corresponding memory media are spaced from each of the source and detector by 150 centimeters. A one microsecond input pulse provides a pulse, including light modulated at the two frequencies 100 and 120 megacycles, in detector 19. That pulse is detected ten nanosecond after the input pulse starts and is of like duration. The delay, typically ten nanoseconds, is due to the transit time, source to detector, for the light. The presence of an opaque spot in memory plane MP2 obstructs light at 110 megacycles.

The invention has been described in terms of a read only memory. To this end, obstruction may be developed in any suitable light addressable medium by well known techniques. The obstructions may be opaque, reflecting, or scattering spots as is well known. On the other hand, obstructions may be developed by means of the arrangement of FIG. 1 by suitably shuttering light from source 13 from reaching an undeveloped photographic plate only in the medium in which the absence of an opaque spot is desired.

What has been described is considered to be merely illustrative and numerous other arrangements according to the principles of this invention may be devised by one skilled in the art without departing from the spirit and scope of this invention.

What is claimed is:

1. A word-organized memory comprising a source of an input beam of plane polarized light, a multistage digital light deflector wherein the path of light transmitted by said deflector is determined responsive to the coded presence and absence of voltages across the various stages therein, each of said stages comprising means for selectively rotating the plane of polarization of said input beam and birefringent means for transmitting said input beam along different paths depending upon the plane of polarization, said deflector being arranged in the optical path of said beam and having input and output ends, means for dividing the light at said output end into a plurality of spaced apart secondary beams each having a first direction for the plane of polarization thereof, a plurality of memory media each positioned in the path of a different one of said secondary beams and including the presence and absence of obstructions defining one bit of each memory word, means for modulating the intensity of each of said secondary beams at a different frequency characteristic for each of said media in a manner to insure that said secondary beams are in said first direction when they are redirected into said output end of said deflector, reflecting means in the path of each of said secondary beams for redirecting those of said secondary beams passed through said memory media back into said output end of said deflector at the same position at which the light exited while the voltage code is maintained, and means separating said input beam from said secondary beams.

2. A word-organized memory in accordance with claim 1 including means positioned at said output end of said deflector for selectively rotating the light leaving said output end to said first direction for said plane of polarization, said last-mentioned means also lying in the path of each of said secondary beams and being operative to rotate said secondary beams to a second direction of said plane of polarization before reentering said deflector.

3. A word-organized memory in accordance with claim 2 wherein said means for modulating includes a plurality of light modulators each comprising a polarizing material and a modulating material oriented for the modulation of light in said first direction, said modulating material having first and second electrodes thereon, and means for applying a voltage thereto at a characteristic frequency.

4. A word-organized memory in accordance with claim 3 wherein said electrodes are at an angle of 45 degrees with respect to said first direction and said polarizing material is of a geometry to provide a quarter-wave retardation of light passing therethrough.

5. A word-organized memory in accordance with claim 1 including means for simultaneously detecting light modulated at different frequencies.

6. A word-organized memory in accordance with claim 1 wherein said means for modulating light comprises a plurality of light modulators each having a polarizing material and a modulating material, said polarizing material having its axis aligned with said first direction.

References Cited

UNITED STATES PATENTS

Re. 26,170 3/1967 Harris.

DAVID SCHONBERG, *Primary Examiner.*

DAVID H. RUBIN, *Examiner.*

R. J. STERN, *Assistant Examiner.*